(No Model.)

A. E. CONVERS.
MACHINE FOR SEPARATING IRON TACKS OR NAILS FROM PARTICLES OF TIN OR ZINC.

No. 358,961. Patented Mar. 8, 1887.

Witnesses.
S. N. Piper
W. B. Tirrey

Inventor.
Albert E. Convers.
by R. H. Eddy atty.

UNITED STATES PATENT OFFICE.

ALBERT ELIJAH CONVERS, OF TAUNTON, MASSACHUSETTS.

MACHINE FOR SEPARATING IRON TACKS OR NAILS FROM PARTICLES OF TIN OR ZINC.

SPECIFICATION forming part of Letters Patent No. 358,961, dated March 8, 1887.

Application filed June 1, 1886. Serial No. 203,698. (No model.)

*To all whom it may concern:*

Be it known that I, ALBERT ELIJAH CONVERS, of Taunton, in the county of Bristol, of the Commonwealth of Massachusetts, have invented a new and useful Improvement in machines for separating iron tacks or nails from loose particles or pieces of tin or zinc that usually accompany them on their removal from the bath used in covering them with the tin or zinc; and I do hereby declare the same to be described in the following specification and represented in the accompanying drawings, of which—

Figure 1:
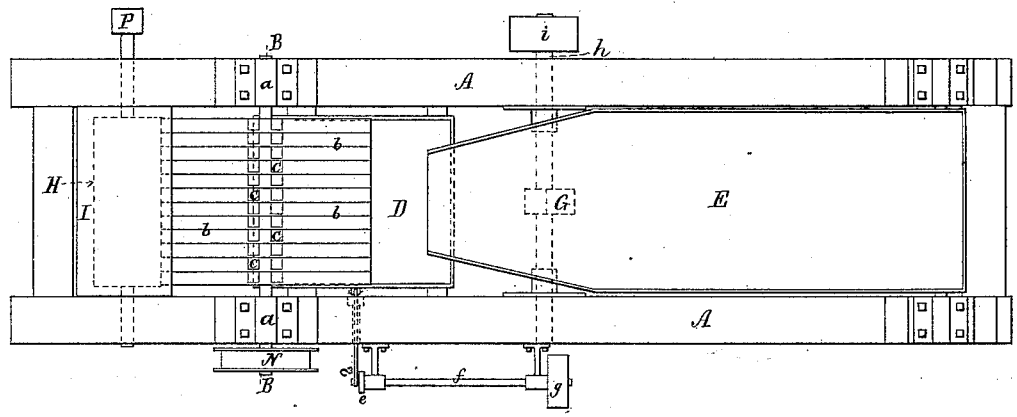
Figure 2:
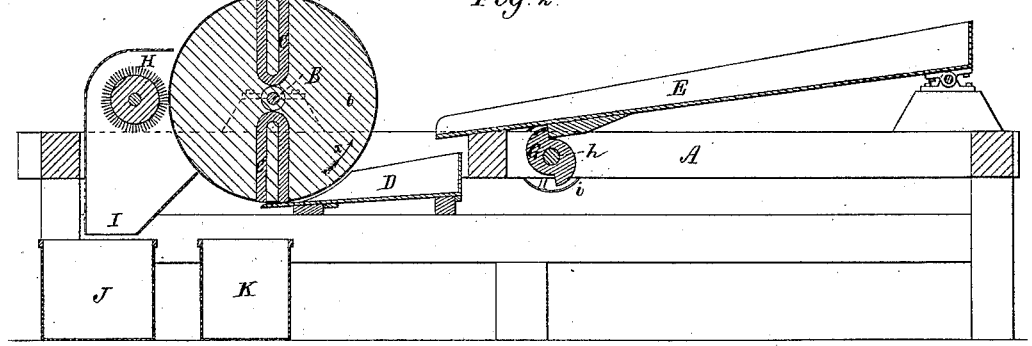

Figure 1 is a top view, and Fig. 2 a longitudinal section, of a machine embodying my invention, the nature of which is defined in the claim hereinafter presented.

In such drawings, A denotes a frame, in which supported in suitable boxes, $a\ a$, and extending across it, is a shaft, B, having fixed upon it side by side a series of disks, $b$, in each of which are arranged, as represented, two or any other suitable number of horseshoe permanent magnets, C, whose poles are at the circumference of the disk. Extending under the series of disks is an inclined brass or copper pan, D, which, closed at its rear, is open at its front end. This pan is provided with suitable mechanism for quickly reciprocating it laterally, such mechanism being a connecting-rod, $c^3$, a cranked wheel, $e$, and a shaft, $f$. The cranked wheel is fixed on one end of the shaft and the connecting-rod is pivoted to the wheel and to the pan. Fastened on the shaft $f$ is a pulley, $g$, for revolving it by a belt from a suitable motor. Projecting over the pan is an inclined chute, E, hinged at its rear part to the frame A and resting on a cam, G, fixed upon a shaft, $h$, arranged as represented, such shaft having fastened on it a pulley, $i$. In front of the series of rotary disks is a revoluble brush, H, which is arranged within a housing or spout, I, that at its lower part opens into a receiver, J. The bristles of the said brush are to be in contact or nearly so with the peripheries of the several disks. Underneath the front end of the pan is a vessel or receptacle, K.

Fixed on the shaft of the disks is a pulley, N, about which an endless belt is to run to put the shaft and its disks in revolution. About the pulley $i$, fixed on the shaft $h$, an endless belt is to run to put such pulley and shaft in revolution. Furthermore, the brush is to be revolved by an endless belt going around a pulley, P, fixed on the brush-shaft.

The tacks or nails and the dross or metal mingled with them are to be thrown into the chute E, which, having quick vertical reciprocating movements imparted to it, will cause the nails and loose metal to descend and fall into the pan. By the reciprocating movements of the pan the nails and loose pieces of the metal will be agitated and spread over the bottom of the pan. The disks revolving in the direction of the arrow $x$, the magnets as they turn with the disks and pass into and out of the pan will attract the tacks or nails and draw them out of the pan, after which, as such tacks or nails are carried around with the magnets, they by the rotary brush will be discharged from the magnets into the housing, and thence will fall into the receiver J, the loose metal in the mean time dropping out of the pan and falling into the receiver K.

In practice the machine has been found to operate to great advantage.

I claim—

The combination of the chute provided with mechanism for agitating or reciprocating it vertically with the pan having mechanism for agitating it or reciprocating it transversely and with the revoluble series of magnets, and the rotary brush and its housing or discharging-spout, all being arranged substantially and to operate as and for the purpose set forth.

ALBERT ELIJAH CONVERS.

Witnesses:
R. H. EDDY,
R. B. TORREY.